United States Patent [19]

Spencer

[11] Patent Number: 4,563,834

[45] Date of Patent: Jan. 14, 1986

[54] CONTAINER FOR FISHING TACKLE

[76] Inventor: Donald R. Spencer, Rte. 1, Box 181, Grafton, Ill. 62037

[21] Appl. No.: 626,764

[22] Filed: Jul. 2, 1984

[51] Int. Cl.⁴ ............................................. A01K 97/00
[52] U.S. Cl. .................................................... 43/57.1
[58] Field of Search ......................... 43/54.1, 55, 57.1; 220/345; 224/920

[56] References Cited

U.S. PATENT DOCUMENTS

| | | | |
|---|---|---|---|
| 2,478,621 | 8/1949 | Attula | 220/345 X |
| 2,814,152 | 11/1957 | Trujillo | 43/57.1 |
| 3,022,600 | 2/1962 | Glascoff | 43/57.1 |
| 3,062,475 | 11/1962 | Miller | 43/54.5 R |
| 3,154,880 | 11/1964 | Campbell | 43/57.1 |
| 3,378,134 | 4/1968 | Wilkinson et al. | 43/54.1 X |
| 3,524,571 | 8/1970 | Young et al. | 224/920 |

*Primary Examiner*—Nicholas P. Godici
*Assistant Examiner*—M. Jordan
*Attorney, Agent, or Firm*—Gravely, Lieder & Woodruff

[57] ABSTRACT

A fishing fly box includes a cylindrical housing in which a spool is located, the spool being mounted to rotate on hollow spindles that project inwardly from the end walls of the housing. The housing has an opening which is normally closed by a cover, but when the cover is open, flanges at the end of the spool are exposed where they may be easily manipulated to turn the spool. Strips of soft retaining material extend axially along the spool to retain the flies, for the hooks of the flies are easily embedded in these strips. The fly box is suspended from a lanyard, and to retrieve a fishing fly, the fisherman merely inserts a finger of his left hand into the spindle of the left end wall, and with the thumb of that hand moves the cover to its open position. Again using the thumb he turns the flange of the spool until the desired fly is at the opening, whereupon the fly is withdrawn. The fly box has an end cap, which is easily detached from the right end wall, and it encloses an annular cavity for storing leaders.

22 Claims, 6 Drawing Figures

U.S. Patent  Jan. 14, 1986  Sheet 1 of 2  4,563,834
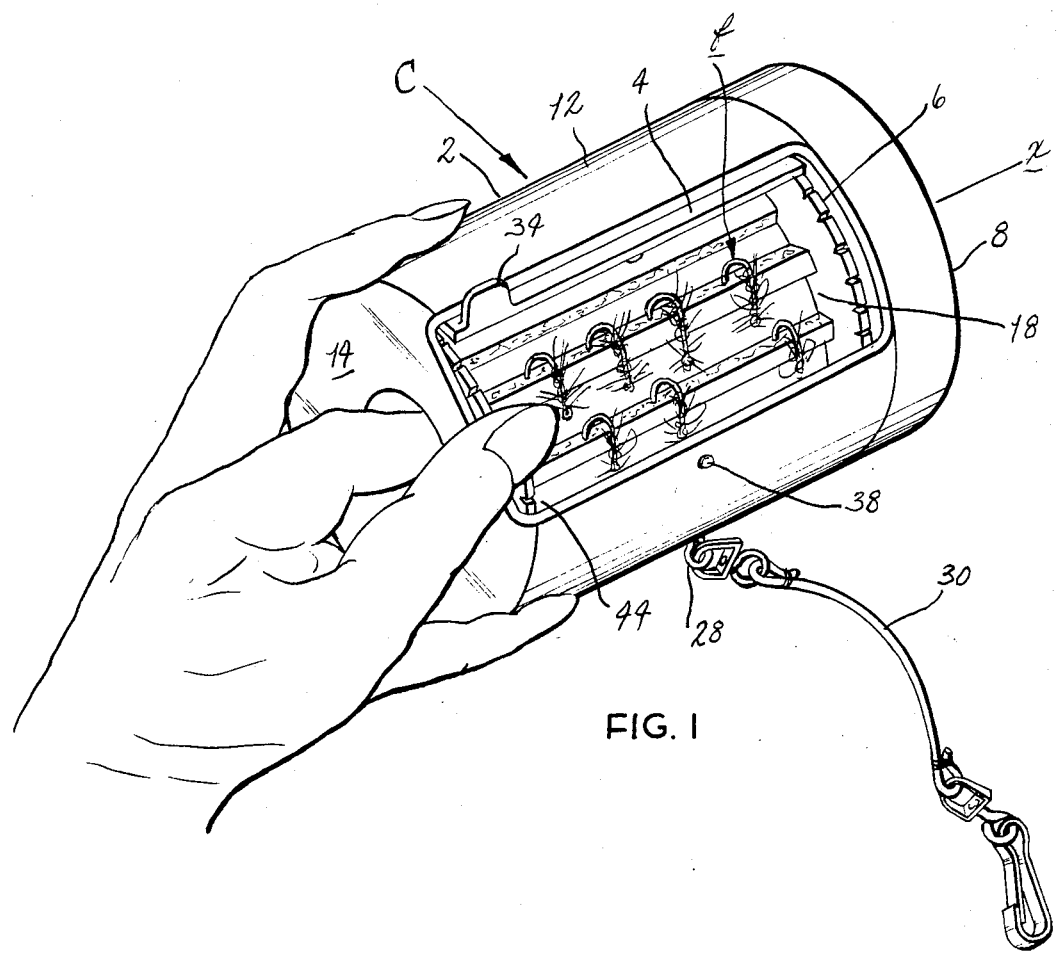
FIG. 1
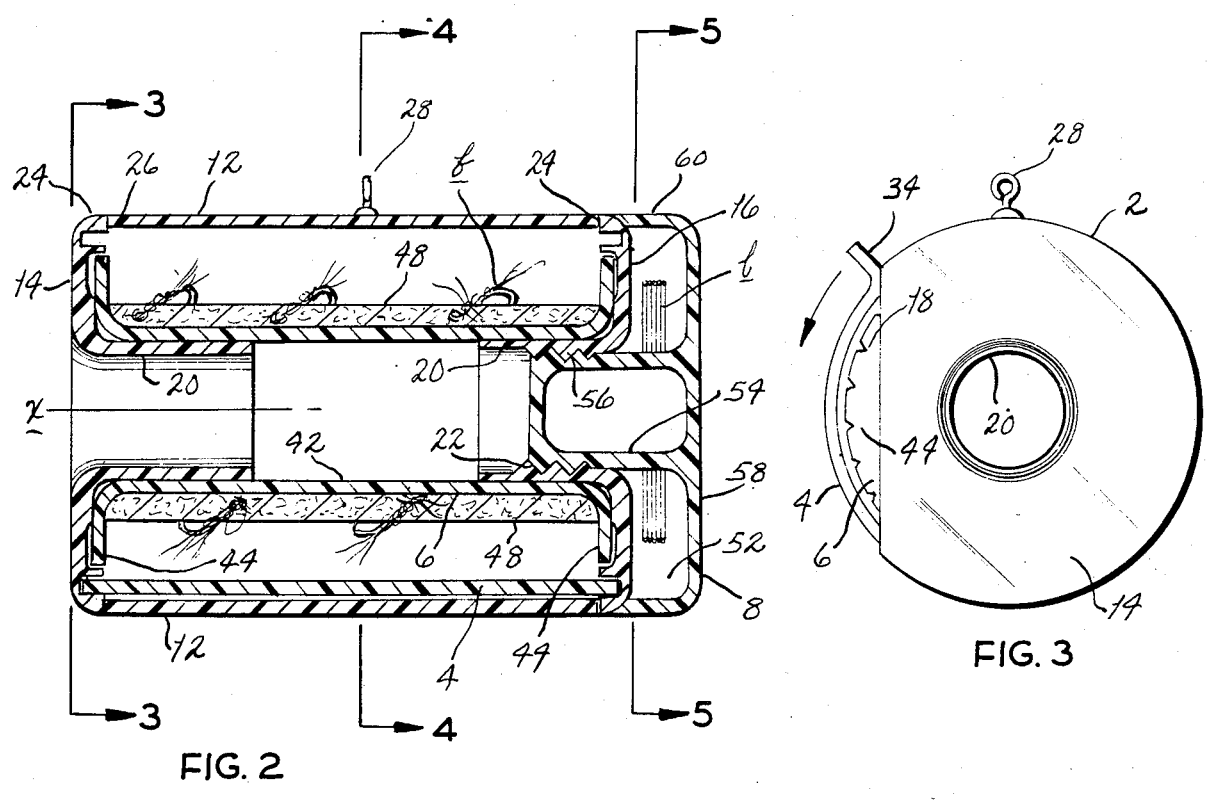
FIG. 2
FIG. 3

CONTAINER FOR FISHING TACKLE

BACKGROUND OF THE INVENTION

This invention relates in general to the sport of fishing and, more particularly, to a container for holding fishing lures, hooks, and the like in a manner that they may be easily retrieved.

In fly fishing, a fly, which is essentially a hook disguised with materials designed to attract fish, is attached to a thin and relatively transparent leader, which is in turn attached to a relatively heavy line that extends from a fly rod. The rod activates the line and propels it as well as the leader and fly outwardly. They fall to the water with the fly extended.

In "dry" fly fishing the line and fly float, the floating of the latter being primarily through the effects of surface tension. The fly resembles a free-floating insect and attracts fish. However, the fly absorbs moisture, and as it does the surface tension is diminished. Thus, the fisherman who participates in dry fly fishing must change flies from time to time.

In "wet" fly fishing the leader and fly sink below the surface of the water where the fly resembles an insect, or an insect in the larva stage, or a minnow or crayfish. Again the fly attracts fish, but being below the surface it is more likely to snag on under water objects. Thus, it is necessary to have additional flies in wet fly fishing as well.

Irrespective of whether the fisherman chooses the dry or wet variation, he will on occasions lose flies or may find that fish are attracted to one type of fly but not another. This requires a supply of extra flies.

Boxes having compartments for individual flies are presently available, but these boxes are not easily opened or manipulated. Indeed, these fly boxes fully occupy two hands. In this regard, one fly box commonly used is circular in configuration and has pie-shaped compartments arranged about the axis of the box. These compartments are normally closed by a circular cover which rotates about its center axis and has an opening which exposes one compartment at a time as the cover is turned. The flies may be sorted by compartment, but not within individual compartments where they tend to become entangled with one another and are difficult to separate. Another common fly box has a hinged cover which when opened exposes compartments or strips of fly holding material.

Since a fly rod must often be held while a fly is changed, manipulating the cover of such a box is not easily done, and retrieving a fly, particularly when it is in a small compartment, requires even more agility. The difficulty is particularly pronounced when fishing from within the water itself, such as in a stream or lake, which is where fly fishing usually takes place.

Because of the difficulty in retrieving flies, many fly fishermen remove flies in advance from their fly boxes and hook them in their hats or pads attached to their vests or pockets. These flies cannot be easily observed or removed. The chance of losing one's hat and all the flies on it, is also ever present.

To a lesser extent, fly fishermen require new leaders from time to time, because of breakage or knots. This requires a supply of leaders. Many fishermen carry extra leaders in their pockets or in envelopes where the leaders become entangled with one another and with other objects and are quite difficult to sort and retrieve.

SUMMARY OF THE INVENTION

One of the principal objects of the present invention is to provide a container for holding fishing flies such that access to the flies is easily achieved by using only one hand. Another object is to provide a container of the type stated which holds the flies in an orderly manner, yet secures them so that they are not easily dropped or blown away. A further object is to provide a container of the type stated which permits quick examination of the flies. An additional object is to provide a container of the type stated which may be conveniently held, and at the same time opened, and the flies therein positioned for examination, all with one hand. Still another object is to provide a container of the type stated which is simple in construction and easy to manufacture. These and other objects and advantage will become apparent hereinafter.

DESCRIPTION OF THE DRAWINGS

In the accompanying drawings which form part of the specification and wherein like numerals and letters refer to like parts wherever they occur—

FIG. 1 is a perspective view of a fishing tackle container constructed in accordance with and embodying the present invention, the container being shown with its cover open and gripped with a single hand, the thumb of which is free to manipulate the cover and the spool;

FIG. 2 is a sectional view in elevation of the container;

FIG. 3 is an end view of the container taken along line 3—3 of FIG. 2 with the cover closed;

DETAILED DESCRIPTION

Figure 4:
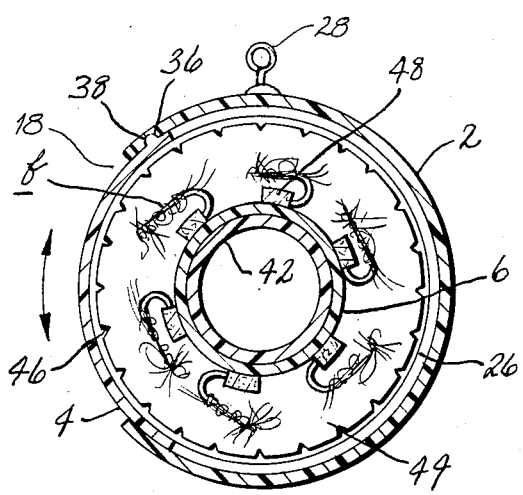
FIG. 4 is a sectional view of the container taken along line 4—4 of FIG. 2, also with the cover closed.

Referring now to the drawings, a box or container C (FIG. 1), which is suited for holding fishing flies f, leaders 1, and the like includes several basic components, namely, a housing 2 that is easily gripped and held with one hand, a cover 4 which normally closes the housing 2, but when opened provides access to the interior of the housings 2, a spool 6 which revolves within the housing 2 and carries the fishing flies f, and an end cap 8 which fits against one end on the housing 2 and holds leaders 1. The cover 4 may be opened with the same hand that is used to hold the housing, and when open, the spool 6 is exposed, and it may be turned, again with the same hand that is used to hold the housing 2. This presents the various flies f that are on the spool 6 in a position where they may be easily withdrawn from the housing 2. The end cap 8 detaches quite easily from the housing 2, and when detached leaders 1 may be removed from it.

The housing 2 possesses a cylindrical configuration, it having a center axis x, and is preferably fabricated from a clear plastic such as acrylic so that its contents may be easily observed. It includes a cylindrical side wall 12 (FIGS. 1 & 4) that is concentric to the axis x and flat left and right end walls 14 and 16 (FIG. 2) respectively, that are perpendicular to the axis x. The end walls 14 and 16 are attached firmly to the ends of the cylindrical side wall 12, and the three enclose a space in which the spool 6 is housed. However, to afford access to this space and the spool 6 in it, the three walls 12, 14 and 16 are cut away in the form of an opening 18 (FIGS. 1 & 4) of rectangular configuration. Two of the margins of this opening are in the end walls 14 and 16, the one in the left end wall 14 forming a chord in that wall (FIG. 3). The remaining two margins are in the cylindrical side wall 12, where they are parallel to the axis x and spaced about 90° apart. Since the container C is normally carried with the end wall 14 presented to the left and the opening 18 presented laterally, or more accurately forwardly away from the user (FIG. 4), one of the margins in the side wall 12 is above the other margin, thus providing for purposes of reference upper and lower margins.

The two end walls 14 and 16 are generally annular in shape (FIG. 3), and at their open centers they merge into hollow spindles 20 (FIG. 2) which project inwardly into the enclosed space where the spindles 20 have smooth outwardly presented surfaces that are of equal diameter and concentric to the axis x. The inwardly presented surface of the spindle 20 on the left end wall 14 is likewise smooth and is large enough to easily accommodate one's index finger or middle finger yet the diameter of the side wall 12 is small enough to enable the remaining fingers to lap over and grip the side wall 12. Thus, the housing 2 may be easily gripped with and held in one hand. The spindle 20 on the right end wall 16 carries a female thread 22 that is likewise concentric to the axis x.

At its periphery each end wall 14 and 16 has an axially directed rim 24 (FIG. 2) along which it is joined to the end edges of the cylindrical side wall 12. The rims 24 contain arcuate grooves 26 (FIGS. 2 & 4), with the groove 26 in the end wall 14 opening toward groove 26 in the end wall 16. The two grooves 26 are of equal diameter and are concentric on the axis x. Each groove 26 leads up to and terminates at the lower margin of the opening 18 in the side wall 12, and the length of the grooves 26 in terms of angular measure, exceeds that of opening 18. Thus, the grooves 26 lie immediately inwardly from the inwardly presented surface of the side wall 12.

Finally the housing 2 has an eyelet 28 (FIGS. 1 & 4) which is attached to its cylindrical wall 12 midway between the ends of that wall. The eyelet 28 is offset slightly from the upper axial margin of the opening 18, that is the margin opposite from the one at which the grooves 26 terminate, the arrangement being such that when the housing 2 is suspended from the eyelet 28, the opening 18 will be presented generally forwardly and laterally. By means of the eyelet 28, a lanyard 30, which may be elastic, is attached to the housing 2 for suspending the entire fishing tackle container C from one's clothing or from around one's neck.

The cover 4 is likewise formed from a transparent material, such as acrylic plastic, it having an arcuate configuration, the radius of which corresponds to that of the grooves 26 in the end walls 12 and 14. Indeed, the cover 4 extends substantially the entire inside length of the housing 2, with its ends being received in the grooves 26. In the other direction, that is the arcuate dimension, the cover 4 occupies an angle somewhat greater than that occupied by the opening 18. The fits between the ends of cover 4 and the two grooves 26 are somewhat loose, and this permits the cover 4 to slide easily within the grooves 26 in the circumferential direction, yet be retained in the axial and radial directions. Indeed, the cover 4 moves easily from a closed position (FIGS. 3 & 4), wherein it extends from one axial margin of the opening 18 to the other so as to close the opening 18, to an open position (FIG. 1), wherein it lies within the cylindrical side wall 12 generally beyond lower margin of the opening 18. Being engaged with the grooves 26, the cover 4 is installed in the housing 2 before the housing 2 is completely assembled.

Near its upper margins, the cover 4 carries a tab 34 which projects outwardly beyond the axial margins of opening 18, so that those margins lie in the path of the tab 34 as the cover 4 moves between its open and closed positions. Thus, when the cover 4 is closed, the tab 34 is against the upper axial margin of the opening 18, and when the cover 4 is open it is against the lower margin. While the tab 34 is near one of the axial margins of the cover 4, it is not along that margin, so the cover 4 when closed underlies the cylindrical side wall 12 at both of the axial margins that define the opening 18. The uppermost portion of the cover 4 carries a detent 36 which, when the cover 4 is closed, engages an indentation 38 in the side wall 12 and retains the cover 4 in its closed position.

A fisherman while supporting the container C with his fingers (FIG. 1), one of which is projected into the spindle 20 that opens out of the left end wall 14, may easily open the cover 4 by bringing his thumb against the tab 34 and urging the tab 34 downwardly with enough force to disengage the detent 36 from the indentation 38. The cover 4 then continues to the open position. The cover 4 is closed by raising it with the thumb until the tab 34 comes against the upper of the two axial margins for the opening 18, in which case the detent 36 will engage the indentation 38.

The spool 6 occupies the interior of the housing 2 and, like the cover 4, is installed before the housing 2 is completely assembled. It may be formed from a suitable polymer, such as acrylic plastic. Actually, the spool 6 fits over the spindles 20 which serve as journals for it, giving it the freedom to turn within the housing 2. To this end, the spool 6 has a hub 42 (FIGS. 2 & 4) which is hollow throughout, its inside diameter being only slightly greater than the outside diameter of the spindles 20 which project into the hub 42. Thus, the hub 42 is free to turn easily on the spindles 20. At the ends of the hub 42, the spool 6 has flanges 44 which are fastened firmly to the hub 42 and indeed may be formed integral with it. The flanges 44, which are circular in configuration, lie along the end walls 12 and 14 of the housing 2 and within the rims 24. The diameter of the left flange 44 is great enough to bring it beyond the left end margin of the opening 18, that is beyond the straight margin in the left end wall 14, so that the left flange 44 projects slightly out of the opening 18. This enables one who is holding the fly box C with a finger extended into the spindle 20 of the left end wall 14 to easily turn the spool 6 by bringing his thumb against the left flange 44 for the spool 6 (FIG. 1). To facilitate this movement, the left flange 44 has serrations 46 along its periphery. Thus, the left flange 44 may be considered a driving wheel or portion for the spool 6.

Finally, the spool 6 carries strips 48 (FIGS. 2 & 4) of a material which is designed to retain fishing flies. The strips 48 are arranged at equal intervals around the hub 42 and are attached to the hub 42, such as by cement, with each extending the full length of the hub 42. Each strip 48 is about $\frac{3}{8}$ inch wide and $\frac{1}{4}$ inch high—large enough for the barb of a fly hook to be embedded in it while allowing the shank of the hook to extend over it. A flexible foamed polymer of the type often used in cushioning devices is suitable for use in strips 48. Also suitable are molded strips. Thus, as the spool 6 is turned, different strips 48 and the flies f on them, are presented at the opening 18 where they may be removed from the housing 2 one at a time.

The end cap 8 fits against the right end wall 16 of the housing 2 (FIG. 2), and when so fitted encloses an annular cavity 52 which is ideally suited for holding coiled leaders 1 of the type used at the ends of fishing lines. To expose the cavity 52 and provide access to the coiled leaders 1, the end cap 8 is detached from the housing 2, and to this end the end cap 8 has a hub 54 provided at its end with a male thread 56 which is configured to mate with the internal thread 22 in the right spindle 20 of the housing 2. The hub 54 is hollow, but its ends are closed to trap enough air to enable the cap 8 to float if it is accidentally dropped in the water. The other end of the hub 54 merges into a flat end wall 58 which is perpendicular to the axis x and closes not only the end of the cavity 52, but the end of the hollow hub 54 as well. The end wall 58 is circular and at its periphery merges into a cylindrical skirt 60, the diameter of which preferably equals that of the cylindrical side wall 12 on the housing 2. The skirt 60, however, is somewhat shorter than the hub 54, so that when the hub 54 at its thread 56 is engaged with the thread 22 of the housing spindle 20 and turned, the free end margin of the skirt 60 will come against the right end wall 16 of the housing 2, thus isolating the cavity 52 and sealing it against the entry of water. The cavity 52 holds enough air to maintain the entire containter C afloat in water, so the container C will not sink if inadvertently dropped into the water.

OPERATION

To load the container C with fishing flies f, the fisherman merely moves the cover 4 to its open position, and then by turning one flange 44 rotates the spool 6 until one of the strips 48 of soft material is centered in the opening 18 of the housing 2. The fisherman then inserts the barbed ends of the fish hooks for the flies f into the sides of the strip 48 of soft material, allowing the shanks of the hooks to extend over the outwardly presented surface of the strip 48 (FIGS. 1 & 4). When one strip 48 has its full complement of flies f, which may be sorted by design or size, the fisherman again rotates the spool 6 by turning it at its flange 44 until another strip 48 is centered in the opening 18, and that strip is loaded in the same manner.

Figure 5:
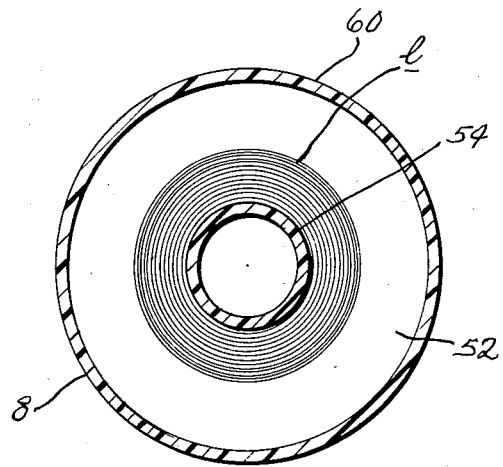
FIG. 5 is a sectional view of the end cap for the container taken along line 5—5 of FIG. 2.

If the fisherman desires to have an extra supply of leaders 1, he merely winds those leaders 1 into coils, if they are not so wound already, and, with the end cap 8 detached from the housing 2 places the coiled leaders 1 around the hub 54 of the cap 8, in which case they will occupy the annular cavity 52 in the cap 8 (FIGS. 2 & 5). Then the hub 54 of the end cap 8 is at its thread 56 engaged with the thread 22 in the spindle 20 for the right end wall 16 of the housing 2. The end cap 8 is turned down until the free edge of its skirt 60 contacts the right end wall 16 of the housing 2. This completely isolates the annular cavity 52 and the leaders 1 within it.

In use, the fisherman places the lanyard 30 around his neck or otherwise attaches it to his clothing such that the fly container C is suspended in front of his chest with the opening 18 in its housing 2 being presented forwardly. Should the fisherman require a new fly f, he merely inserts one of the digits of his left hand, preferably his index finger, into the spindle 20 on the left end wall 14, and with other digits grips the cylindrical side wall 12 in the region of the left end wall 14 (FIG. 1). This enables him to maintain a firm grip on the housing 2 and to steady it. With still another digit, preferably the thumb, he urges the tab 34 on the cover 4 downwardly with enough force to disengage detent 36 on the cover 4 from the indentation 38 in the cylindrical side wall 12. This releases the cover 4, which is moved to its open position, sliding in the grooves 26 along the rims 24 of the two end walls 14 and 16 as it does. The cover 4 may also be opened merely by pushing the tab 34 downward without bothering to grip the housing 2, but by gripping the housing 2 one is immediately ready to turn the spool 6.

Once the cover 4 is open, the fisherman, if he has not already done so, grips the housing 2 at its left spindle 20 and along its side wall 12 as previously described, and then lifts the container C upwardly with his left hand until the spool 6 is visible through the opening 18 in the housing 2 (FIG. 1). He then turns the spool 6 by bringing his thumb against the flange 44 at the left end wall 14 and moving that flange circumferentially. Indeed, the spool 6 is turned until the strip 48 carrying the desired fishing fly f is presented at the opening 18. He thereupon reaches through the opening 18 and easily removes the selected fly f from the spool 6. This may be done with the thumb and index finger of the hand in which the fly rod is held while the fly rod is still in that hand. After the selected fly f is removed from the spool 6, the fisherman closes the cover 4 by exerting a force against its tab 34 until the detent 36 again engages the indentation 38 in the side wall 12. He then releases the container C and allows it to be suspended solely from its lanyard. When securing the selected fly f to the fly line, the fisherman's hands are completely free of the container C.

Should the fisherman desire to have a new leader 1, he holds the housing 2 with one hand and turns the end cap 8 with the other until the thread 56 of its hub 54 disengages the thread 22 in the spindle 20 at the right end wall 16. A leader 1 is then withdrawn from the cavity 52, and the end cap 8 is thereafter replaced on the housing 2 by threading its hub 54 into the spindle 20 of the right end wall 16.

Thus, flies f may be individually examined in and retrieved from the container C by using essentially one hand, and this leaves the other hand free for holding a fly rod or some other object. Additional leaders 1 are also readily accessible and are obtained with considerable ease.

Of course, the container C may be supplied without the end cap 8, in which case either hand may be used to hold the housing 2 and manipulate the spool 6 within it.

Figure 6:
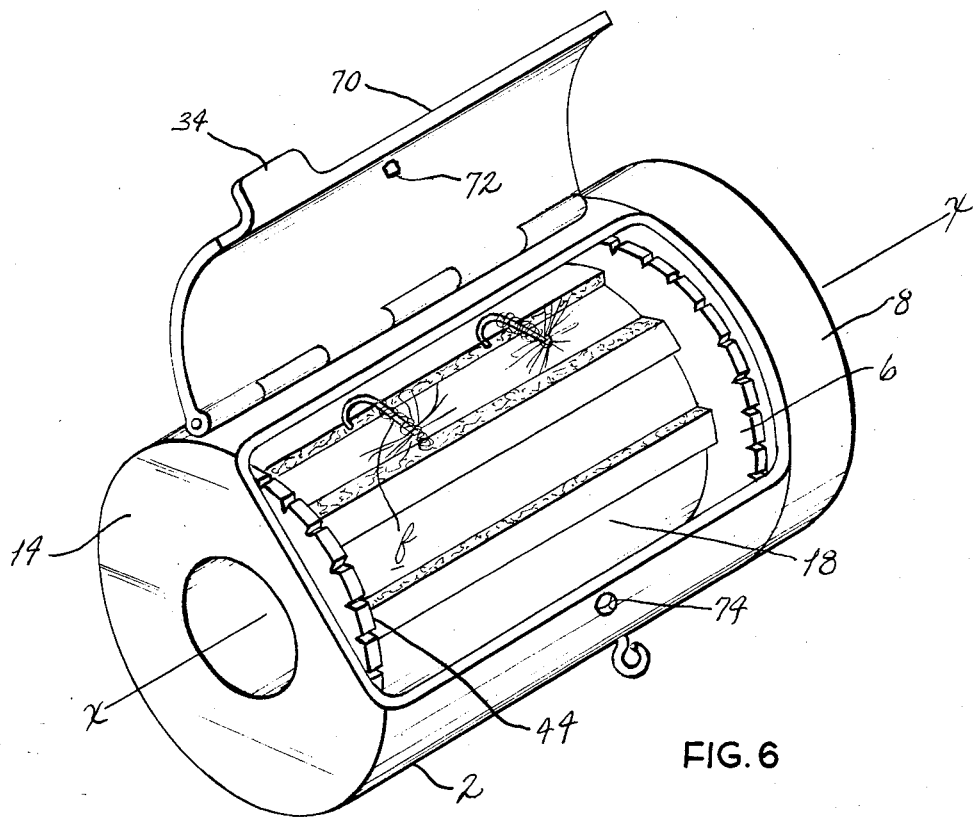
FIG. 6 is a perspective view of a container provided with a modified cover.

Also, in lieu of the sliding cover 4, a modified cover 70 (FIG. 6), likewise of arcuate configuration, may be hinged to the cylindrical side wall 12 along the lower margin of that wall. The hinged cover 70 has a catch 72 which, when the cover 70 is closed, engages a keeper 74 on the side wall 12 near the upper margin of the opening 18. The hinged cover 70 is easily opened with one by applying pressure to tab 75 with the thumb to swing it outwardly, another digit of that hand being inserted into the spindle 20 of the left end wall 14, while still other digits are used to grip the side wall 12. After the cover has been opened, the thumb is used to move the nearby flange 44 and thereby rotate the spool 6 to bring the desired fly f to the opening 18.

This invention is intended to cover all changes and modifications of the example of the invention herein chosen for purposes of the disclosure which do not constitute departures from the spirit and scope of the invention.

What is claimed is:

1. A box for holding fishing lures, said box comprising: a housing having an opening that provides access to the interior of the housing and is large enough to accommodate fishing lures; the housing also having a cavity that is large enough to accommodate a digit on a person's hand so as to enable that person to stabilize and hold the housing with that hand by reason of the digit being in the cavity; a spool located within the housing and being capable of rotating in the housing, the spool having a hub and a driving portion that is attached rigidly to the hub, the driving portion being located at least in part where it may be manipulated from outside of the housing by another digit on the same hand; and retaining means on the spool for holding fishing lures.

2. A box according to claim 1 wherein the retaining means comprises a material into which the barb on the hook for a fishing fly may be inserted.

3. A box according to claim 2 wherein the hub of the spool is cylindrical and the material of the retaining means is arranged in strips that extend generally axially along the hub.

4. A box according to claim 3 wherein the strips project outwardly from the hub.

5. A box according to claim 4 wherein the spool has flanges at both of its ends, and the strips of the material for the retaining means extend between the flanges.

6. A box according to claim 1 wherein the housing is generally cylindrical in configuration and the spool rotates about an axis that is fixed in position with respect to the housing, that axis being also the axis of the housing's cylindrical configuration.

7. A box according to claim 1 and further comprising an end cap secured to the housing at one end thereof such that it does not obscure the opening, the end cap being easily detached from the housing and containing a cavity which is exposed when the end cap is detached.

8. A box according to claim 7 wherein the end cap when in place on the housing traps enough air in the cavity to enable the box to float if it is dropped in water.

9. A box according to claim 1 wherein the driving portion is a flange which is mounted on the hub and projects out of the opening.

10. A box according to claim 1 wherein at least one of the spindles is hollow and its hollow interior opens out of one end of the housing, and the hollow interior of that spindle constitutes the cavity.

11. A box for holding fishing flies and the like, said box comprising: a cylindrical housing having end walls and a spindle extending inwardly from one of the end walls, the spindle being hollow and opening out of the end wall from which it extends so that a digit of one's hand may be inserted into the spindle to hold the box, the housing also having an opening that provides access to the interior thereof; a spool located within the housing where a portion of it is exposed at the opening in the housing, the spool being capable of rotating in the housing on the spindle, which serves as a journal for the spool, and about an axis that is fixed in position with respect to the housing so as to present different portions of the spool at the opening, the axis about which the spool rotates also being the axis of the cylindrical housing; and retaining means on the spool for holding fishing flies.

12. A box according to claim 11 wherein the spool has a hub which encircles the spindle and a flange projecting outwardly from the hub adjacent to said one end wall, the flange being exposed at the opening such that one whose digit is inserted into the spindle to hold the box may with another digit of the same hand contact the flange and rotate the spool.

13. A box according to claim 12 wherein a flange of the spool projects out of the housing opening adjacent to said one end wall.

14. A box according to claim 12 and further comprising a cover carried by the housing and being capable of moving between open and closed positions, the cover when in the closed position extending over the housing opening and when in the open position being displaced from the opening to permit access to the spool.

15. A box according to claim 14 wherein the housing is generally cylindrical in configuration; and wherein the cover is arcuate in configuration, and when moving between its open and closed positions, slides along an arcuate path that is concentric to the axis of the cylindrical configuration.

16. A box according to claim 15 wherein means project outwardly from the cover to grip and move the cover, said means being against one margin of the opening when the cover is in its open position and being against another margin when the cover is in its closed position.

17. In combination with fishing flies, a container comprising: a housing having an opening and a hole offset from the opening, the hole being large enough to accommodate a digit on one's hand so that one may hold the container merely by inserting that digit into the hole, the opening being close enough to the hole so that another digit of the same hand may extend to the opening; a spool located within the housing and having a hub and a flange attached to the hub, with the flange being accessible at the opening and further being close enough to the hole to be turned by the other digit on the same hand, the spool being capable of rotating about an axis that is fixed in position with respect to the housing so that access to different portions of the spool may be gained through the opening merely by bringing the other digit against the flange and turning the spool; the fishing flies being on the spool.

18. The combination according to claim 17 wherein the spool includes a material in which the barbs of the hooks for the fishing flies are embedded.

19. The combination according to claim 18 wherein the material is arranged in strips that extend axially along the hub and project outwardly from the hub; and wherein the hooks of the fishing flies project into the sides of the strips and their shanks extend generally over the strips and generally circumferentially with respect to the hub.

20. A box for holding fishing flies and the like, said box comprising: a housing having end walls and spindles that project inwardly into the interior of the housing from the end walls, the housing also having an opening that provides access to the interior thereof; a spool located on the spindles and within the housing such that a portion of it is presented at the opening in the housing, the spool being capable of rotating in the housing on the spindles to present different portions of the spool at the opening; retaining means on the spool for holding fishing flies; an end cap attached to the spindle on one of the end walls of the housing such that it is at the end of the housing and does not obscure the opening, the end cap being easily detached from the housing and containing a cavity which is exposed when the end cap is detached.

21. A box according to claim 20 wherein the end cap includes a hub which threads into the spindle at one end of the housing and the cavity is annular in configuration and encircles the hub of the cap.

22. A container for holding fishing tackle, said container comprising: a housing having a side wall and first and second end walls attached to the ends of the side wall, the side wall having an opening in it for providing access to the interior of the housing, the first end wall having a hollow spindle extending into the interior of the housing with the interior of the spindle forming a hole that is exposed at the first side wall and is configured such that a digit of one's hand may be inserted into the hole to hold and steady the container, the opening in the side wall being close enough to the hole in the spindle to enable another digit on the same hand to reach the opening; and a spool located in the housing on the spindle and being capable of rotating about the spindle, the spool having a flange which projects out of the opening such that it may be turned by the other digit which is capable of reaching the opening, the spool being capable of holding fishing tackle.

* * * * *